United States Patent [19]

Ishikawa et al.

[11] Patent Number: 4,589,593
[45] Date of Patent: May 20, 1986

[54] DEVICE FOR CONTROLLING TEMPERATURE OF SWITCH KNOB

[75] Inventors: Seiji Ishikawa, Toyota; Masanori Hirose, Okazaki, both of Japan

[73] Assignee: Toyota Jidosha Kabushiki Kaisha, Japan

[21] Appl. No.: 735,064

[22] Filed: May 17, 1985

[30] Foreign Application Priority Data

May 17, 1984 [JP] Japan .................................. 59-99386

[51] Int. Cl.$^4$ ............................................. G05D 23/00
[52] U.S. Cl. ....................................... 236/94; 116/205; 116/DIG. 17; 62/3
[58] Field of Search ............................ 62/125, 127, 3; 165/11.1; 236/94; 116/205, 207, 279, 307, DIG. 17

[56] References Cited

U.S. PATENT DOCUMENTS

| 2,543,389 | 2/1951 | Van Lennep | 116/205 |
| 2,581,207 | 1/1952 | Sambleson | 116/205 |
| 3,459,262 | 8/1969 | Powell | 116/205 X |
| 4,241,868 | 12/1980 | Perkins | 236/94 X |

Primary Examiner—Harry Tanner
Attorney, Agent, or Firm—Finnegan, Henderson, Farabow, Garrett & Dunner

[57] ABSTRACT

Comparison is made between an output from a temperature detecting element for detecting temperature of a control knob of a switch for controlling temperature, with a reference signal generated in association with a preset temperature of the control knob, and at least means for cooling or/and heating the control knob is driven on the basis of result of the comparison, whereby the control knob is held at preset temperature, so that the temperature of the control knob can be held at the preset temperature by a relatively simple control device.

10 Claims, 6 Drawing Figures

DEVICE FOR CONTROLLING TEMPERATURE OF SWITCH KNOB

BACKGROUND OF THE INVENTION

1. Field of the Invention

This invention relates to devices for controlling temperatures of switch knobs, and more particularly, a device for controlling temperature of a switch knob, suitable for use as a switch for controlling a target temperature of an air conditioner in a vehicle such as a motor vehicle, wherein the switch knob can be readily identified.

2. Description of the Prior Art

In a vehicle such as a motor vehicle, switches for controlling loads of various lamps, an air conditioner and the like are provided at positions where, particularly, a driver can easily operate, and, when the driver desires to operate or control one of the loads, he operates the switch upon identifying it. However, in order to further facilitate the operation of the vehicles, recently, there is a trend toward increased number of various switches, and, there is a possibility of becoming difficult to identify the switch with the increase of the number of the switches.

Now, to facilitate the identification of a switch, as shown in FIGS. 5 and 6, there has been made such a proposal that control knobs 12, 14 and 16 disposed on a plate 11 of a switch 10 are changed in shape and way of disposition, whereby, even if a driver does not look at the control knob directly, it becomes possible for him to perceive differences in shape or position of one of the control knobs when he touches it and to identify the function of the control knob which he has touched, so that he can readily select the control knob which he desires to operate.

As a switch in which a control knob can be identified by a picture identification method, in Japanese Utility Model Laid-open No. 51838/1980 for example, there has been made a proposal, wherein, in a switch device provided with a light emitting member which emits a light when a switch portion in a picture showing a vehicle drawn on a flexible indication plate is proceed, a portion of the light emitting member is projected from the aforesaid switch portion on the flexible indication plate to thereby facilitate the switch operation when the switch device is controlled.

However, there has heretofore been presented such a problem that, unless the driver becomes satisfactorily familiar with the shapes or way of disposition of the control knobs, he may make mistakes in selecting or discriminating the control knob.

SUMMARY OF THE INVENTION

The present invention has been developed to obviate the above-described disadvantages of the prior art and has as its object the provision of a device for controlling temperature of a switch knob, wherein, even if the control knobs are identical in shape and way of disposition with one another, a mere touch by a finger tip of an operator makes it possible for him to identify control knobs so that he can operate the control knob by groping without turning his sight to the switch.

To this end, the present invention contemplates that, in a device for controlling temperature of the control knob of a switch for performing a temperature control, as the gist thereof is shown in FIG. 1, the device includes: a temperature detecting element for detecting temperature of the control knob; a reference signal generator for generating a reference signal in association with a preset temperature of the control knob; a comparator for comparing an output from the temperature detecting element with a reference signal from the reference signal generator; a driving circuit actuated in response to an output from the comparator; and at least cooling or/and heating means actuated in response to an output from the driving circuit, for holding the control knob at the preset temperature.

A specific form of the present invention is of such an arrangement that the control knob is formed of a highly heat conductive material and the control knob is subjected to a thin and highly durable surface treatment, whereby the means for heating or/and cooling is reduced in capacity, so that the temperature control switch can be easily made compact in size.

Another specific form of the present invention is of such an arrangement that the temperature detecting element is a thermistor disposed close to the rear surface of the control knob, so that the device can be easily made compact in size.

A further specific form of the present invention is of such an arrangement that a hysteresis is provided in switching the comparator, so that the cooling or/and heating means may not be on-off operated frequently beyond necessity.

A still further specific form of the present invention is of such an arrangement that the heating means is made to be a heater disposed close to the rear surface of the control knob, so that the switch can be made light in weight and compact in size.

A still more further specific form of the present invention is of such an arrangement that the cooling means is made to be an electronic cooling device disposed close to the rear surface of the control knob, so that the switch can be made light in weight and compact in size, similarly to the above.

A still more further specific form of the present invention is of such an arrangement that the control knob is made to be knobs for presetting temperatures of an air conditioner including a control knob for elevating a preset temperature and a control knob for lowering a preset temperature, to thereby facilitate the discrimination of the control knobs.

A still more further specific form of the present invention is of such an arrangement that the control knob for elevating a preset temperature is held at a predetermined temperature higher than the normal temperature, so that the control knob can be very easily discriminated by the natural feeling of the operator.

A still more further specific form of the present invention is of such an arrangement that the control knob for lowering a preset temperature is held at a predetermined temperature lower than the normal temperature, so that the control knob can be very easily discriminated by the natural feeling of the operator, similarly to the above.

A still more further specific form of the present invention is of such an arrangement that the shapes and/or way of disposition of the control knobs are made to be different ones in association with the preset temperatures of the control knobs, so that the control knobs can be discriminated further easier.

According to the present invention, the reference signal generated in association with the predetermined temperature of the control knob is compared with an output from the temperature detecting element for detecting the temperature of the control knob, the means for cooling or/and heating the control knob is driven on the basis of the result of the comparison, whereby the control knob is held at the predetermined temperature, so that the device for controlling the temperature of the switch knob can be realized by a relatively simple arrangement. In consequence, even when the sight of the operator is not turned toward the switch, and, even if the shapes and way of disposition of the knobs are identical with one another, the feeling of the tempature by the finger tip makes it possible to instantaeously identify what the switch which has been touched by the finger tip is. In consequence, it becomes possible to operate by the groping. Therefore, the control during operation of the vehicle can be made reliably, and moreover, even a person who has troubles in eyes can operate the switch.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiment of the device for controlling temperature of a control switch of an air conditioner, to which the present invention is applied.

Figure 1:
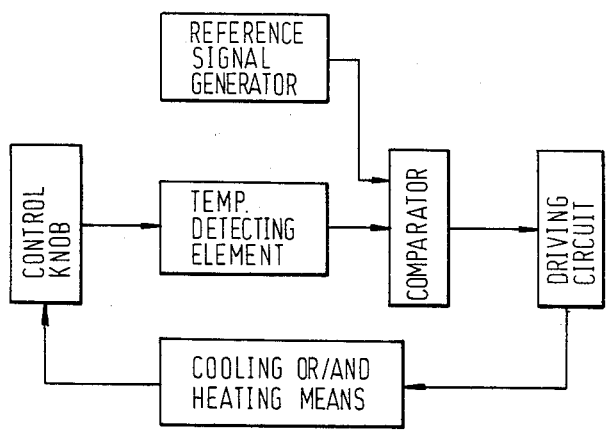
FIG. 1 is a block diagram showing the outline of the arrangement of the device for controlling temperature of a switch knob according to the present invention.
Figure 2:
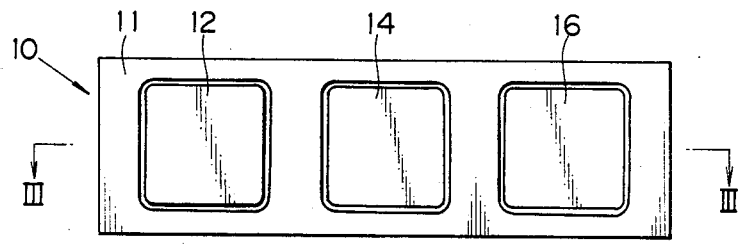
FIG. 2 is a front view showing an arrangement of an embodiment of the control switch of the air conditiner, to which the present invention is applied.
Figure 3:
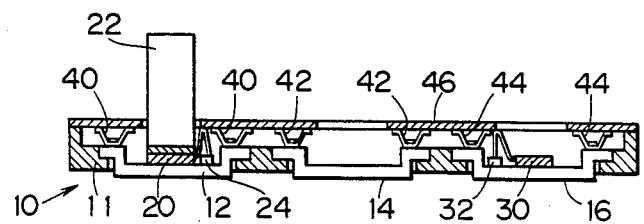
FIG. 3 is a longitudinal sectional view taken along the line III—III in FIG. 2.

As shown in FIGS. 2 and 3, according to this embodiment, the present invention is applied to a control switch 10 of an air conditioner, wherein three control knobs 12, 14 and 16 (designated at 12 is control knob for lowering a preset temperature, 14 a control knob for on-off operating an air conditioner and 16 a control knob for elevating a preset temperature), all of which have shapes (substantially regular squares) identical with one another, are disposed side by side.

Both the control knob 12 for lowering a preset temperature and the control knob 16 for elevating a preset temperature are formed of a highly heat conductive material such for example as metal like aluminum and the like, and the surfaces of the knobs are subjected to thin and highly durable surface treatment such for example as plating, heated painting and the like, so as to obtain a high heat conductivity.

On the other hand, the control knob 14 for on-off operating an air conditioner to be maintained in the normal temperature conditions is formed of an ordinary material such as resin.

An electronic cooling device 20 such as a thermomodule is disposed close to the rear surface of the control knob 12 for lowering a present temperature. When electric currnet is supplied to this electronic cooling device 20, heat is taken away from the control knob 12 for lowering a preset temperature and the heat is transferred to a radiating fin 22. Disposed close to the rear surface of this control knob 12 for lowering a preset temperature is a thermistor 24 for detecting the temperature of this control knob 12, which is utilized for automatically controlling a cooling temperature of this control knob 12 for lowering a preset temperature. In consequence, this control knob 12 for lowering a preset temperature is constantly held at a predetermined temperature lower than the normal temperature in association with its function of lowering a preset temperature of the air conditioner.

On the other hand, a heater 30 is disposed close to the rear surface of the control knob 16 for elevating a preset temperature. When supplied with electric current, this heater 30 generates a heat to heat the control knob 16 for elevating a preset temperature. Also, disposed close to the rear surface of this control knob 16 for elevating a preset temperature is a thermistor 32, which is used for automatically controlling a heating temperature of the control knob 16 for elevating a preset temperature. In consequence, this control knob 16 for elevating a preset temperature is constantly held at a predetermined temperature higher than the normal temperature in association with its function of elevating a preset temperature of the air conditioner.

As against the above, to the control knob 14 for on-off operating an air conditioner constituting a main switch for on-off operating the air conditioner is not performed any temperature control, and consequently, the control knob 14 is held at the normal temperature conditions.

In FIG. 3, designated at 40, 42 and 44 are rubber contact points which put print patterns arranged on a printed circuit board 46 into conduction by being pressed by the control knobs 12, 14 and 16, respectively. Here, the reason why respective two rubber contact points 40, 42 and 44 are provided on every control knobs 12, 14 and 16 is to try to take ballance between the loads of the control knobs 12, 14 and 16, however, each one rubber contact point may be provided on each control knob.

Figure 4:
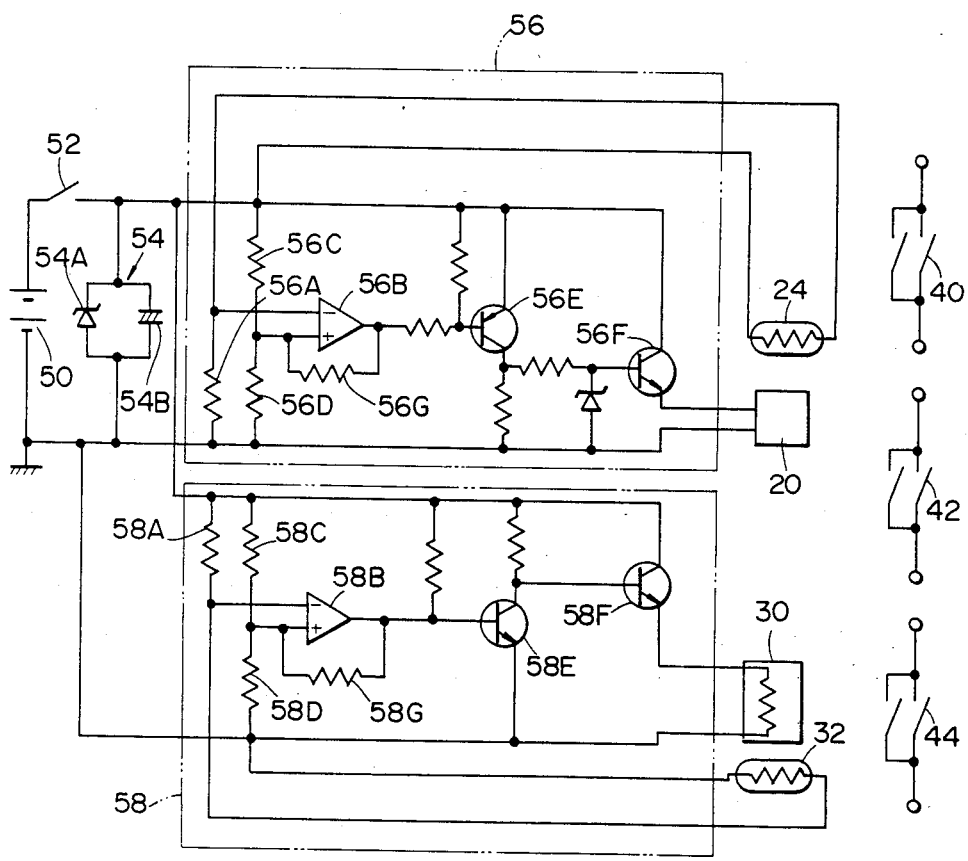
FIG. 4 is a circuit diagram showing the arrangement of the control device used in the embodiment.

FIG. 4 shows the control device in the embodiment. This control device parincipally includes:

a battery 50;

an ignition switch 52;

a noise absorbing circuit 54;

a cooling temperature control circuit 56 for controlling a current supplied to the electronic cooling device 20 so that a temperature of the control knob 12 for lowering a preset temperature, detected by the thermistor 24 can be a predetermined temperature; and a heating temperature control circuit 58 for controlling a current supplied to the heater 30 so that a temperature of the control knob 16 for elevating a preset temperature, detected by the thermistor 32 can be predetermined temperature.

This control device is actuated by the applying of a voltage from the battery 50 to the cooling temperature control circuit 56 and the heating temperature control circuit 58 through the ignition switch 52.

The noise absorbing circuit 54 is constituted by a Zener diode 54A and a capacitor 54B, which are parallelly connected, and has a function of absorbing noises to prevent a malfunction caused by the noises.

The cooling temperature control circuit 56 is actuated in the following manner. Namely, the thermistor 24 is varied in resistance value by the temperature of the control knob 12 for lowering a preset temperature, whereby a voltage divided by this thermistor 24 and a resistor 56A is applied to a minus terminal of a comparator 56B. On the other hand, a reference voltage divided by resistors 56C and 56D is applied to a plus terminal of the comparator 56B. Now, when the temperature of the control knob 12 for lowering a preset temperature is higher than the predetermined temperature, a resistance value of the thermistor 24 is lower than the reference value, whereby a voltage higher than the reference voltage is applied to the minus terminal of the comparator 56B. In consequence, an output from the comparator 56B comes to be a low voltage, whereby a transistor 56E is turned on and an output transistor 56F is turned on too. In consequence, a current is supplied to the electronic cooling device 20, whereby the control knob 12 for lowering a preset temperature is cooled. On the other hand, when the control knob 12 for lowering a preset temperature is cooled, whereby the resistance value of the thermistor 24 is increased and a voltage lower than the reference voltage is applied to the minus terminal of the comparator 56B, the output from the comparator 56B comes to be a high voltage. In consequence, both the transistor 56E and an output transistor 56F are turned off. In consequence, the current supplied to the electronic cooling device 20 is cut off, whereby the cooling of the control knob 12 for lowering a preset temperature is stopped. By repeating the above-described processes, the temperature of the control knob 12 for lowering a preset temperature is held at the predetermined temperature lower than the normal temperature. A feedback resistor 56G in the comparator 56B of this cooling temperature control circuit 56 is aimed at providing a hysteresis in switching the comparator 56B.

On the other hand, the heating temperature control circuit 58 is actuated in the following manner. Namely, the thermistor 32 is varied in resistance value by the temperature of the control knob 16 for elevating a preset temperature, whereby a voltage divided by the thermistor 32 and a resistor 58A is applied to a minus terminal of a comparator 58B. On the other hand, a reference voltage divided by resistors 58C and 58D is applied to a plus terminal of the comparator 58B. Now, when the temperature of the control knob 16 for elevating a preset temperature is lower than the predetermined temperature, a resistance value of the thermistor 32 is higher than the reference voltage, whereby a voltage higher than the reference voltage is applied to the minus terminal of the comparator 58B. In consequence, an output from the comparator 58B comes to be a low voltage, whereby a transistor 58E is turned off, while an output transistor 58F is turned on. In consequence, a current is supplied to the heater 30 to heat the control knob 16 for elevating a preset temperature. On the other hand, when the control knob 16 for elevating a preset temperature is heated, whereby the resistance value of the thermistro 32 is lowered and a voltage lower than the reference voltage is applied to the minus terminal of the comparator 58B, the output from the comparator 58B comes to be a high voltage. In consequence, the transistor 58E is turned on, while the output transistor 58F is turned off. In consequence, the current supplied to the heater 30 is cut off, whereby the heating of the control knob 16 for elevating a preset temperature is stopped. By repeating the above-described processes, the temperature of the control knob 16 for elevating a preset temperature is held at the predetermined temperature higher than the normal temperature. A feedback resisator 58G in the comparator 58B of this heating temperature control circuit 58 is aimed at providing a hysteresis in switching the comparator 58B.

In this embodiment, the feedback resistors 56G and 58G are provided in both the comparators 56B and 58B of the cooling temperature control circuit 56 and the heating temperature control circuit 58, respectively, whereby hysteresis are provided in switching the comparators 56B and 58B, respectively, so that the electronic cooling device 20 and the heater 30 cannot be on-off operated frequently beyond necessity.

Figure 5:
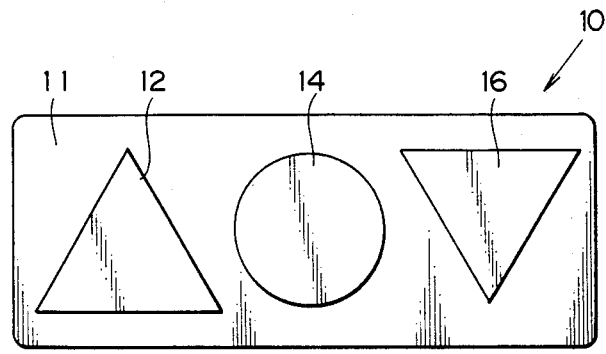
FIG. 5 is a front view showing an example of the conventional switch.
Figure 6:
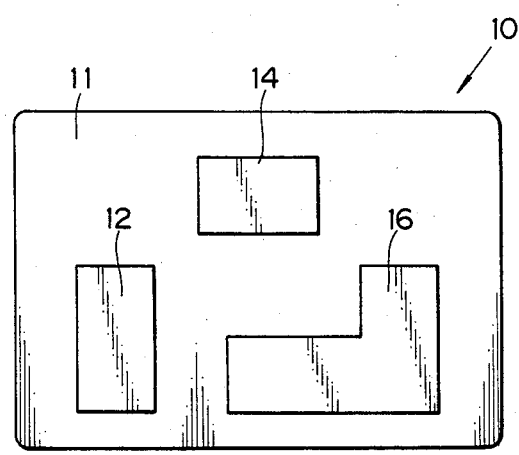
FIG. 6 is a front view showing another example of the conventional switch.

Furthermore, in this embodiment, the control knobs 12, 14 and 16 are made identical in shape and way of disposition with one another, so that the control knob parts can be intesively arranged and the assembling can be made easier. Additionally, the shapes and way of disposition of the control knobs need not necessarily be limited to this, and, for example, like the conventional example shown in FIGS. 5 and 6 above, it is possible to make the control knobs discernible further easier by changing the shapes of the control knobs, and further, by changing the plane of disposition between the control knob 12 for lowering a preset temperature, the control knob 16 for elevating a preset temperature and the control knob 14 for on-off operating an air conditioner. In these cases, when it is difficult to feel the temperature because the finger tip is cold, the control knobs can be identified to some extent because of the differences in shape and plane of disposition.

Further, in this embodiment, the present invention is applied to the control switch of the air conditioner, whereby the control knob 12 for lowering a preset temperature is held at the predetermined temperature lower than the normal temperature and the control knob 16 for elevating a preset temperature is held at the predetermined temperature higher than the normal temperature, so that the control knobs can be maintained in the conditions agreeing with the natural feeling of the operator and the control knobs can be very easily identified.

Furthermore, in this embodiment, the electronic cooling device 20 is used as the means for cooling the control knob and the heater 30 is used as the means for heating the control knob, so that the switch can be made light in weight and compact in size. Additionally, the means for cooling or heating the control knob need not necessarily be limited to the electronic cooling device or the heater, and, for example, such an arragement is adoptable that part of air stream blown out of the air conditioner may be utilized to blown cooled air or heated air against the rear surface of the control knob.

Further, in this embodiment, each of the control knobs achieves a single function, so that the temperature control can be easily performed. Further, when it is desired to give a plurality of control functions to a single control knob, preset temperatures are changed with every control functions, so that the difficulty in identification due to the multiplexing of control functions can be avoided.

Furthermore, in this embodiment, the control knobs 12 and 16 are formed of a metal having high heat conductivity such as aluminum, so that the electronic cooling device 20 and the heater 30 can be low in capacity and compact in size. Additionally, depending upon the capacities of the heating or/and cooling means, shapes of the control knobs and the like, the control knobs 12 and 16 may be formed of a material relatevely low in heat conductively, such as plastics, glass or the like.

What is claimed is:

1. A device for controlling temperature of control knob of a switch for controlling temperature, comprising:
    a temperature detecting element for detecting temperature of said control knob;
    a reference signal generator for generating a reference signal in association with preset temperature of said control knob;
    a comparator for each comparing an output from said temperature detecting element with a reference signal from the reference signal generator;
    a driving circuit actuated in response to an output from said comparator; and
    at least cooling or/and heating means actuated in response to an output from said driving circuit, for holding said control knob at the preset temperature.

2. A device for controlling temperature as set forth in claim 1, wherein said control knob is formed of a material having a high heat conductivity and are subjected at the surfaces thereof to a thin and highly durable surface treatment.

3. A device for controlling temperature as set forth in claim 1, wherein said temperature detecting elememt is a thermistor disposed close to the rear surface of said control knob.

4. A device for controlling temperature as set forth in claim 1, wherein a hysteresis is provided in switching said comparator.

5. A device for controlling temperature as set forth in claim 1, wherein said heating means is a heater disposed close to the rear surface of said control knob.

6. A device for controlling temperature as set forth in claim 1, wherein said cooling means is an electronic cooling deivce disposed close to the rear surface of said control knob.

7. A device for controlling temperature as set forth in claim 1, wherein said control knob is knobs for presetting temperature of an air conditioner, including a control knob for elevating a preset temperature and a control knob for lowering a preset temperature.

8. A device for controlling temperature as set forth in claim 7, wherein said control knob for elevating a preset temperature is held at a predetermined temperature higher than a normal temperature.

9. A device for controlling temperature as set forth in claim 7, wherein said control knob for lowering a preset temperature is held at a predetermined temperature lower than a normal temperature.

10. A device for controlling temperature as set forth in claim 1, wherein shapes and/or way of disposition of said control knobs are ones different from one another in association with the preset temperatures.

* * * * *